United States Patent [19]
Barnes et al.

[11] Patent Number: 6,059,942
[45] Date of Patent: May 9, 2000

[54] ELECTROLYTIC GENERATION OF HALOGEN BIOCIDES

[76] Inventors: Ferman Richard Barnes; Deborah Barnes, both of 1626 W. 150 S., West Point, Utah 84015

[21] Appl. No.: 09/057,129

[22] Filed: Apr. 8, 1998

[51] Int. Cl.[7] .............................. C25B 9/00; C25B 11/04
[52] U.S. Cl. .......................... 204/269; 204/275; 204/292
[58] Field of Search .................................. 204/269, 292, 204/268, 275

[56] References Cited

U.S. PATENT DOCUMENTS

| | | | |
|---|---|---|---|
| 4,457,816 | 7/1984 | Galluzzo et al. | 204/270 X |
| 4,790,923 | 12/1988 | Stillman | 204/269 |
| 4,861,451 | 8/1989 | David | 204/269 X |
| 5,460,706 | 10/1995 | Lisboa | 204/269 |

*Primary Examiner*—Donald R. Valentine

[57] ABSTRACT

Disclosed is an improved electrolytic cell 10 for the generation of low cost halogen biocidally active agent from an aqueous solution having a low halogen salt content for the use in the treatment of swimming pools and spas or other liquid effluents, especially those the fresh water swimming pools or spas. The electrolytic cell is used in line with pumps generally associated with the distribution of waters for swimming pools, spas or other facilities. The electrolytic cell has electrodes 11 made of a noble metal that are not directly in the path of the flow of the liquid.

8 Claims, 3 Drawing Sheets

ELECTROLYTIC GENERATION OF HALOGEN BIOCIDES

BACKGROUND OF THE INVENTION

This invention relates to an electrolytic halogen biocide generating system. This system uses an electrolytic cell to produce a halogen biocide from an aqueous solution having a low halogen salt content to treat aqueous effluents, especially those of swimming pools and spas.

More particularly, an improved electrolytic cell having improved electrodes which is used in line of pumps used in the distribution of aqueous solutions where the aqueous solution contains a low halogen salt content. This employs an enclosure containing electrodes where effluent is treated thereby with the halogen being electrolytically produced from within the confines of the electrolytic cell.

Chlorine has been used for some time as a biocidally active agent for use with aqueous solutions. In the past this has been done largely with chemical compounds such as hypochlorite compounds or chlorine gas. The addition of chemical compounds or chlorine gas to treat aqueous solutions has become costly, and it is likely that there will be greater restrictions upon the manufacturing, transportation, and storing of these compounds and gases. Onsite electrolytic treatment of aqueous solutions has several advantages over the traditional methods including much lower cost, greater ecological acceptability, and energy conservation.

Prior art electrolytic cells consist of spaced planner electrode plates made of titanium or other material and plated with a noble metal. These electrolytic cells typically last from one to three years after which the electrolytic cell must be replaced or the electrodes must be replated, if not destroyed, at a substantial cost. These electrode plates are directly in the flow of the liquid causing an undesirable restriction of the flow.

Prior art electrolytic cells are long and are often difficult to install on new or existing plumbing lines of the facility. Prior art electrolytic cell apparatus apparently has not identified the proper electrode materials and design thereof and has not defined the control apparatus necessary to maximize the use of solid noble metals as the electrode material in a practical apparatus.

Therefore it would be exceedingly advantageous to develop an improved electrolytic cell system with improved electrodes for the generation of halogen biocides for the treatment of aqueous solutions.

SUMMARY OF THE INVENTION

It is therefore an object of this invention to provide an improved electrolytic cell for the generation of halogen biocides especially chlorine from a solution containing a very low halogen salt, especially sodium chloride so that the cell could be placed in line with the pumping system of a given facility.

It is another object of this invention to provide an electrolytic cell which can be manufactured at a cost within the realm of commercial feasibility for use in on site generation on a small scale.

It is another object of this invention to provide an electrolytic cell with electrodes made of a noble metal so that the life of the electrodes is greatly increased over prior art.

It is another object of this invention to reduce the size of the electrolytic cell and the electrodes over prior art.

It is another object of this invention to provide a cell where the electrodes are not directly in the path of the flow of the liquid flowing through the cell so that there is no restriction to the flow.

It is another object of this invention to provide a power source to the cell that has a polarity reversing circuit so that the electrodes remain clean eliminating the calcium build up on the cathode.

These and other objects of the present invention, together with the advantages thereof over existing and prior art forms which will become apparent to those skilled in the art from the detailed disclosure of the present invention as set forth hereinbelow, are accomplished by the improvements herein shown, described and claimed.

It has been found that an electrolytic cell for the production of halogen for use as biocidal agent can consist of: an enclosure to contain electrodes attached to the enclosure interior in parallel fashion; consisting of one or more anodes and one or more cathodes with adjacent electrodes connected to the opposite polarity; means for connecting a power source to the electrodes to promote an electrical field between the electrodes of opposite polarity to evolve halogen which is dissolved in the liquid flowing through the cell and adding a halogen salt concentration in the liquid of approximately 3,000 PPM.

The preferred embodiment of the subject electrolytic cell is shown by way of example in the accompanying drawings without attempting to show all of the various forms and modifications in which the invention might be embodied; the invention being measured by the amended claims, not by the details of this disclosure.

These and other, further and more specific objects and advantages of the invention will be apparent to those skilled in the art from the following detailed description thereof, taken in conjunction with the drawings, in which:

REFERENCE NUMBERS IN DRAWINGS

Figure 1:
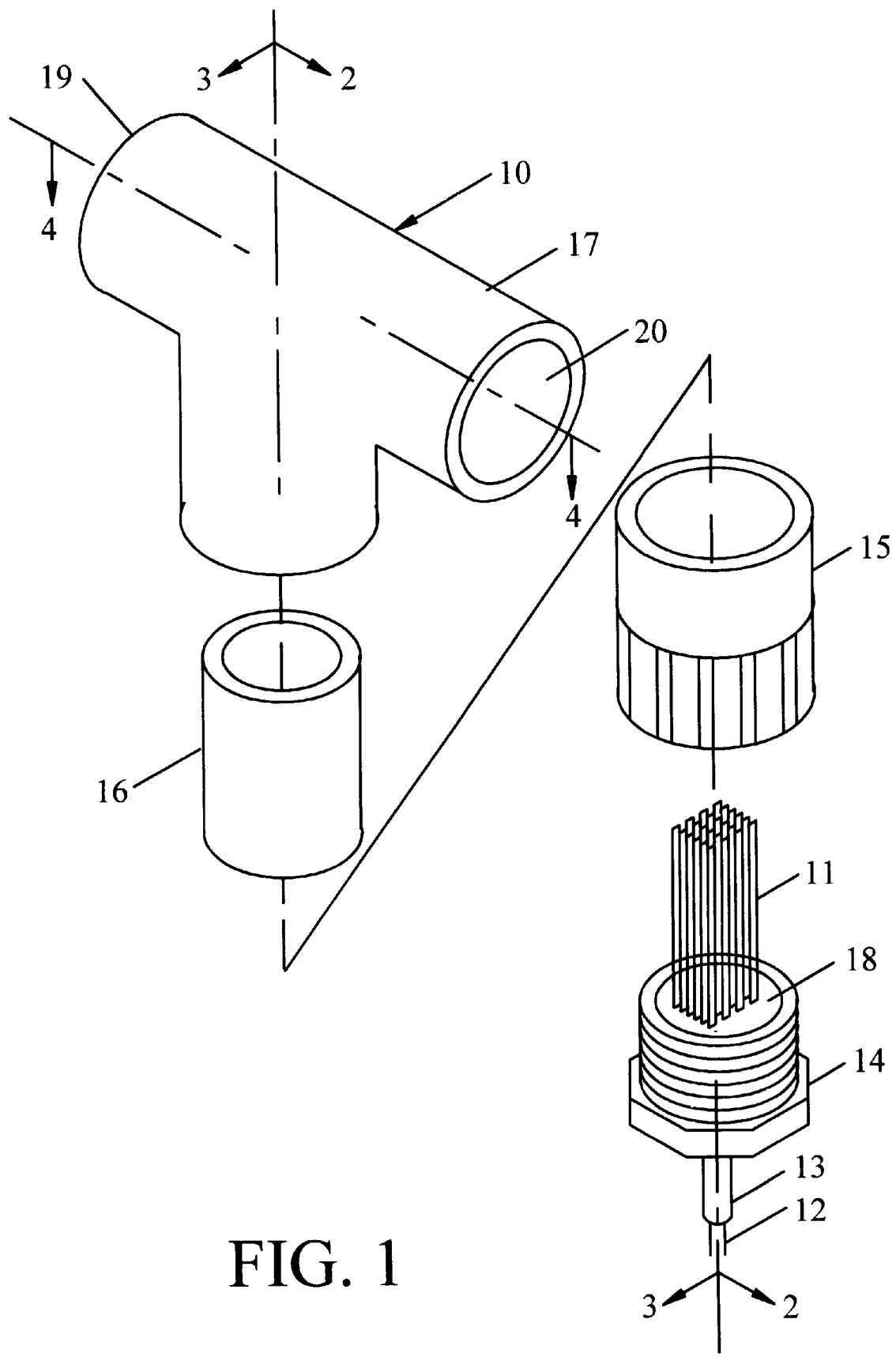
FIG. 1 is an exploded perspective view of an electrolytic cell for generating a biocidal agent from a dilute solution of a halogen salt according to the concepts of the present invention.
Figure 2:
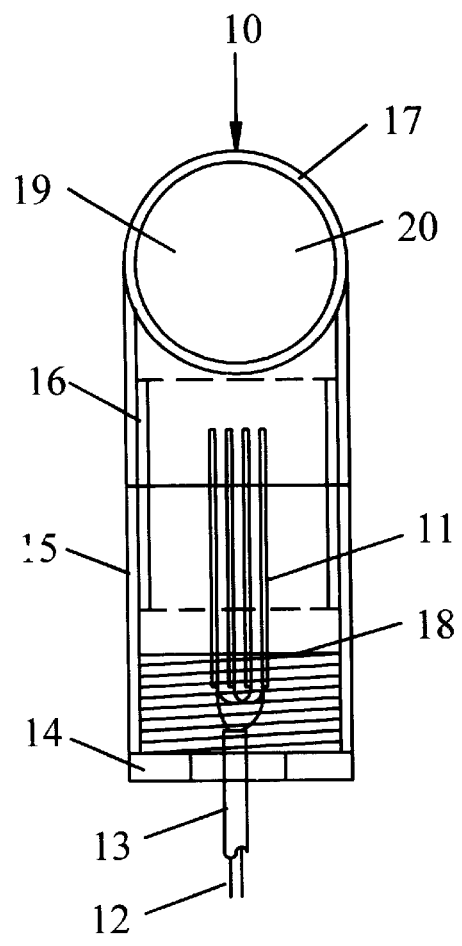
FIG. 2 is a side section view of the electrolytic cell taken substantially along line 2—2 of FIG. 1
Figure 3:
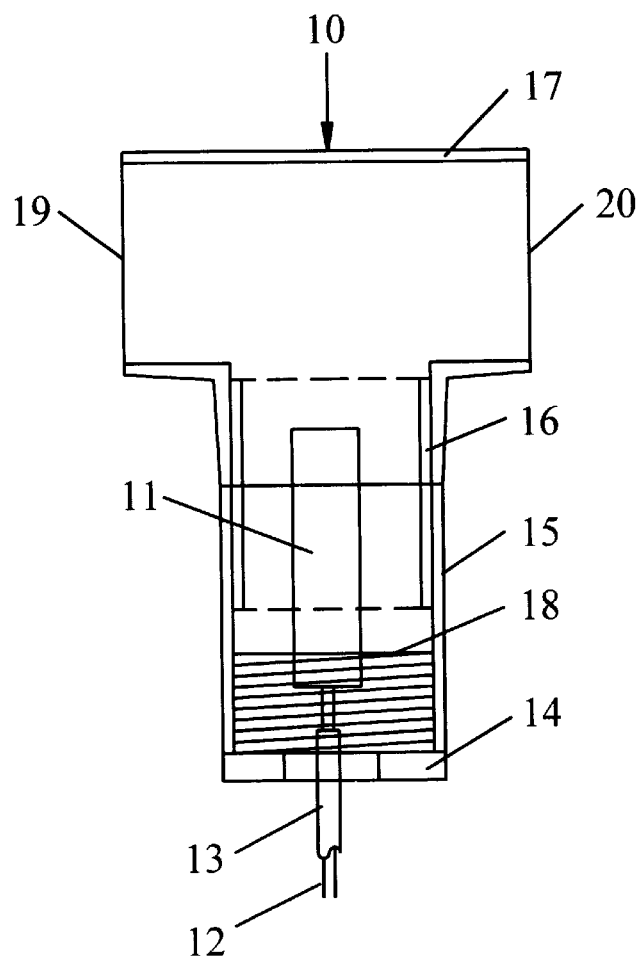
FIG. 3 is a side section view of the electrolytic cell taken substantially along line 3—3 of FIG. 1

| | |
|---|---|
| 10 electrolytic cell | 18 sealant |
| 11 electrodes | 26 outlet line |
| 12 wires | 28 pump |
| 13 power cord | 30 filter tank |
| 14 threaded fitting | 32 heater |
| 15 adapter fitting | 34 feed lines |
| 16 length of pipe | 36 timer control |
| 17 tee fitting | 38 cell control |

DESCRIPTION OF THE PREFERRED EMBODIMENT

Referring to FIGS. 1, 2, 3, and 4 numeral 10 depicts an electrolytic cell constructed in accordance with the concepts of the present invention. The electrolytic cell 10 has a cell enclosure which is made of a non-conducting or insulating material which is chemically resistant to the liquid to be used in the cell. Suitable examples of such materials would include polymethyl methacrylate, polyvinyl chloride, polypropylene and polyethylene. Electrodes 11 are soldered to wires 12 with the adjacent electrode 11 connected to the wire of opposite polarity. Wires 12 are enclosed in a power cord 13, and connected to the power source as the current distributors. The power cord 13 passes through a hole drilled in the threaded fitting 14 where the electrodes 11 and wires 12 are sealed and held in place using a sealant 18 which is non-conducting and resistant to the liquid to be used in the cell. Threaded plug fitting 14 is threaded into threaded to slip adapter fitting 15 using a sealant on the threads. Threaded to slip adapter 15 is glued to a length of pipe 16 which is glued to a tee fitting 17 to make up the cell enclosure 10. An ingress 19 and the egress 20 of the liquid is provided so that the liquid can flow in and out of the cell without any restriction by the electrodes 11. The electrodes 11 are not directly in the liquid flow resulting in less physical stress on the thin electrodes.

Figure 4:
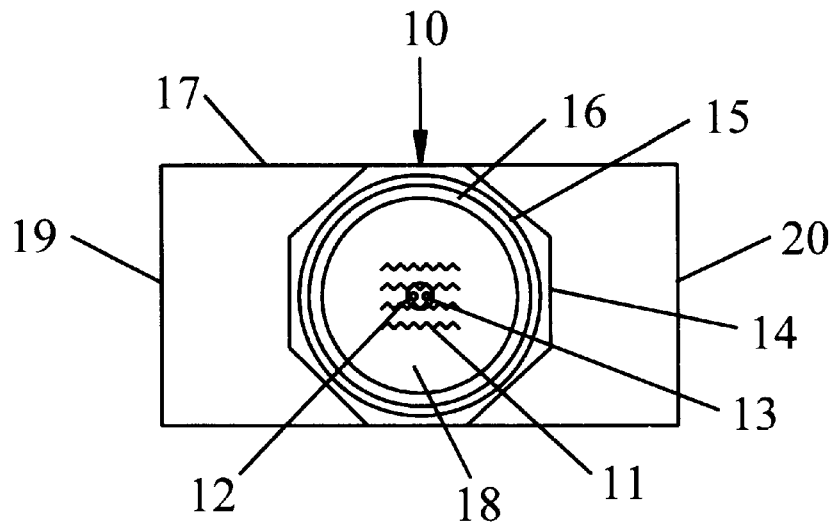
FIG. 4 is a top section view of the electrolytic cell taken substantially along line 4—4 of FIG. 1

As it can be seen in FIG. 1 and 4 the electrodes 11 have a series of 90 degree bends across their entire width giving the electrodes 11 much greater strength greatly reducing the thickness required for the electrodes 11. This greatly reduces the cost of the electrodes making them commercially feasible.

The electrodes 11 are made of a noble metal such as platinum that is inert to the electrolysis process and lasting many years. It has been found that existing and prior art electrodes typically made of titanium and plated with a platinum or other noble metal plating typically last for 1 to 3 years. Tests of over three years have shown no significant wear to the platinum electrodes of the electrolytic cell 10 tested in several swimming pools and spas.

The electrodes 11 must be thick enough to maintain their integrity throughout the life of the cell. Suitable thickness would be in the range of 0.001 to 0.005 inch with 0.002 to 0.003 inch being the preferred thickness.

It has been found that electrodes 11 can consist of one anode and one cathode or as many as eight anodes and eight cathodes, with one to three anodes and one to three cathodes being the preferred number.

It has been found that the voltage to the electrodes 11 can be in the range of 5 to 50 volts DC with the preferred voltage being 12 to 24 volts.

It has been found that the spacing between the electrodes can be between 0.05 to 0.25 inch with 0.1 to 0.2 inch being the preferred spacing.

The electrolytic cell 10 and especially the area of the electrodes are sized according to the halogen biocide active agent capacity necessary for the desired purpose. This will be generally in the range of 18 to 48 square inches of electrode surface area for a typical residential swimming pool of 12,000 to 40,000 gallons, and 4 to 8 square inches for a typical spa of 300 to 400 gallons.

Figure 5:
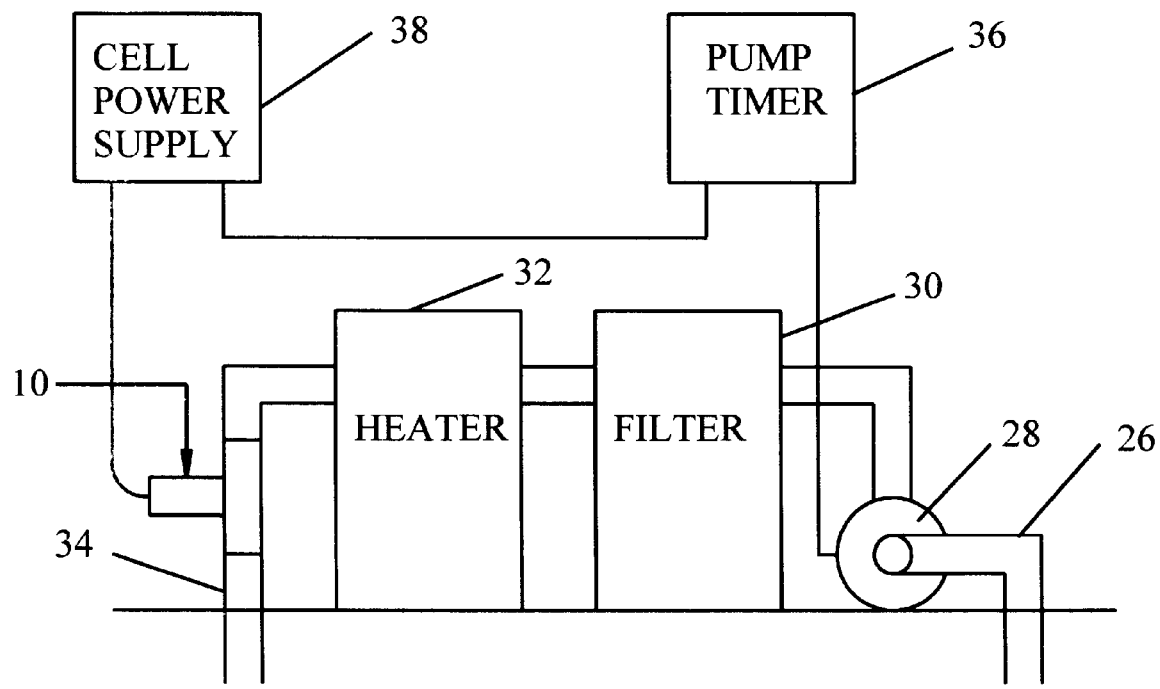
FIG. 5 is a diagrammatic view showing the environmental structure which might be associated with such an electrolytic cell of FIGS. 1–4 for use in chlorinating a swimming pool.

FIG. 5 is diagrammatic representation of a typical swimming pool liquid distribution system with an electrolytic cell 10 according to the concepts of the present invention incorporated therein for the production of halogen biocidal agent necessary for the pool. Liquid distribution system as hereinafter referred to is referred to include any transport of any portion or the whole of the liquid to be treated including: a swimming pool, spa, or cooling tower recirculation system. The present demand for such biocidal agents in Swimming pools is for chlorine because its biocidal activity but such an electrolytic cell 10 according to the concepts of the present invention could just as easily produce other halogens, such as bromine or iodine, which are also biocidally active agents. As seen in FIG. 5 there is an outlet line 26 from the swimming pool which may be connected to a pump 28 and to a filtering tank 30 and a heater 32 and the water returned to the pool by feedlines 34. The electrolytic cell 10 can be suitably connected after the heater 32 in the feedlines 34 going to the pool. A timer control 36 is used to control the pump 28 and the AC voltage to the cell control 38, which controls the operation of the electrolytic cell 10 according to the needs of the swimming pool being maintained. The size of the fittings used to make a suitable electrolytic cell 10 for the use of producing a sufficient amount of biocide agent for swimming pools up to 40,000 gallons could be of the same size as is typically used in swimming pools. This makes the installation of the electrolytic cell easy, as the cell is glued into place like other like fittings, and is small fitting easily into new or existing plumbing.

In this particular use for the chlorination of the swimming pool, a suitable means for controlling the pump 28 and the power to the cell control 38 would be the use of a typical pump timer 36. A suitable cell control 38 would have a rectifier at a low voltage and current density and a timer circuit to reverse the DC voltage at equally times to the electrodes 11 every 1 to 3 hours so that the electrodes 11 remain free of calcium on the cathode.

One feature of the present invention is that the electrolytic cell 10 can function with a very low concentration of halogen salt in the system. The concentration recommended for use with the cell ranges between 2,000 to 7,500 PPM. Generally, as in the current use for the production of chlorine this will amount to a sodium chloride concentration in the range of 2,500 to 3,500 PPM although it is contemplated that other halogen salts might be used to produce different halogens for improved results. The preferred halogen salt concentration is within the range of 2,500 to 3,500 PPM.

It is contemplated that the electrolytic cell 10 in addition to its use for swimming pools could just as easily be used for halogen biocidal agent generation necessary for spas, cooling towers or many other aqueous systems. Such cells can be easily sized to the quantity requirements of the various systems so that a very safe onsite generation of halogen biocidal agent can be effected.

Thus it should be apparent from the foregoing description of the preferred embodiment that the subject electrolytic cell 10 as herein shown and described accomplished the objects of the invention and solved the problems attended to the treatment of liquids with halogen biocidal agents.

What is claimed is:

1. An electrolytic cell for the production of halogen for use as a biocidal agent comprising: an enclosure; means for connecting said enclosure to a liquid distribution system of the facility to be biocidally affected so as to enable liquid flow therethrough; a plurality of electrodes attached to said enclosure interior in parallel fashion and not directly in the path of the flow of the liquid being biocidally affected; said electrodes being made of a noble metal; said electrodes having a series of 90 degree bends across their width; means for connecting said enclosure to said liquid distribution system consisting of openings at opposing ends of said enclosure; means for connecting a power source to said electrodes to promote an electrical field for evolution of halogen which is adapted for dissolution in the liquid when flowing through said distribution system; said liquid, when present, being adapted to have a halogen salt concentration greater than 2,000 PPM.

2. An electrolytic cell according to claim 1 wherein said electrodes have a thickness in the range of 0.001 to 0.005 inch.

3. An electrolytic cell according to claim 1 wherein the space between said electrodes is in the range of 0.05 to 0.25 inch.

4. An electrolytic cell according to claim 1 wherein said electrodes have a series of 90 degree bends across their entire width spaced in the range of 0.05 to 0.25 inch.

5. An electrolytic cell according to claim 1 wherein said electrodes have a total area in the range of 4 to 48 square inches.

6. An electrolytic cell according to claim 1 wherein said means for connecting a power source is connected to said electrodes wherein adjacent electrodes are of opposite polarity.

7. An electrolytic cell according to claim 1 wherein electrodes number in the range of 1 anode and 1 cathode to 8 anodes and 8 cathodes.

8. An electrolytic cell according to claim 1 wherein said electrodes are held in place with a sealant.

* * * * *